United States Patent [19]

Peterson

[11] Patent Number: 5,597,260
[45] Date of Patent: Jan. 28, 1997

[54] PIN RETENTION SYSTEM

[75] Inventor: Louis G. Peterson, Queensland, Australia

[73] Assignee: G.E.T. Australia Pty Ltd., Queensland, Australia

[21] Appl. No.: 341,102

[22] Filed: Nov. 18, 1994

[30] Foreign Application Priority Data

Nov. 19, 1993 [AU] Australia ................. PM2514

[51] Int. Cl.[6] ................................................. F16B 21/04
[52] U.S. Cl. ................... 403/319; 403/348; 403/316; 403/79; 59/85
[58] Field of Search ................. 403/348, 349, 403/319, 317, 316, 315, 79; 411/553, 551, 396, 549; 59/86, 84, 85, 93

[56] References Cited

U.S. PATENT DOCUMENTS

| 630,169 | 8/1899 | Black | 403/348 X |
|---|---|---|---|
| 847,719 | 3/1907 | Arnold | 403/316 X |
| 1,030,527 | 6/1912 | Nelson | 403/79 X |
| 1,113,981 | 10/1914 | Gailor | 403/267 |
| 1,222,997 | 4/1917 | Rottmer | 403/79 X |
| 1,363,477 | 12/1920 | Lowe | 403/316 X |
| 4,337,614 | 7/1982 | Briscoe | 59/86 |
| 4,756,638 | 7/1988 | Neyret | 403/349 X |
| 4,914,903 | 4/1990 | Bernt et al. | 59/86 |
| 5,046,881 | 9/1991 | Swager | 59/86 X |

FOREIGN PATENT DOCUMENTS

WO89/08789  9/1989  WIPO ................. 403/349

Primary Examiner—Anthony Knight
Attorney, Agent, or Firm—Lowe, Price, LeBlanc & Becker

[57] ABSTRACT

A releasable connecting pin for a shackle or the like comprises a pin (45) having a cylindrical body (46) with a head (47) at one end and a boss (48) at the other end. The boss comprises a cylindrical neck (49) and spaced radially extending projections (50a, 50b, 50c) in the form of a male coupling element. A female coupling element comprises apertured flange plates (51, 52) having apertures (53) of a shape complementary to the cross sectional shape of the boss (48) through the projections (50a, 50b, 50c) to permit the flange plates (51, 52) to slide over the boss (48). One flange plate (51) is rotatable about the neck (49) to misalign the boss projections (50a, 50b, 50c) with corresponding notches in the aperture (53) to engage the flange plate (51) behind the boss (48). Set screws 58 extend through aligned apertures (54, 55) in the flange plates (51, 52) to prevent relative rotation and disengagement from the boss (48).

22 Claims, 6 Drawing Sheets

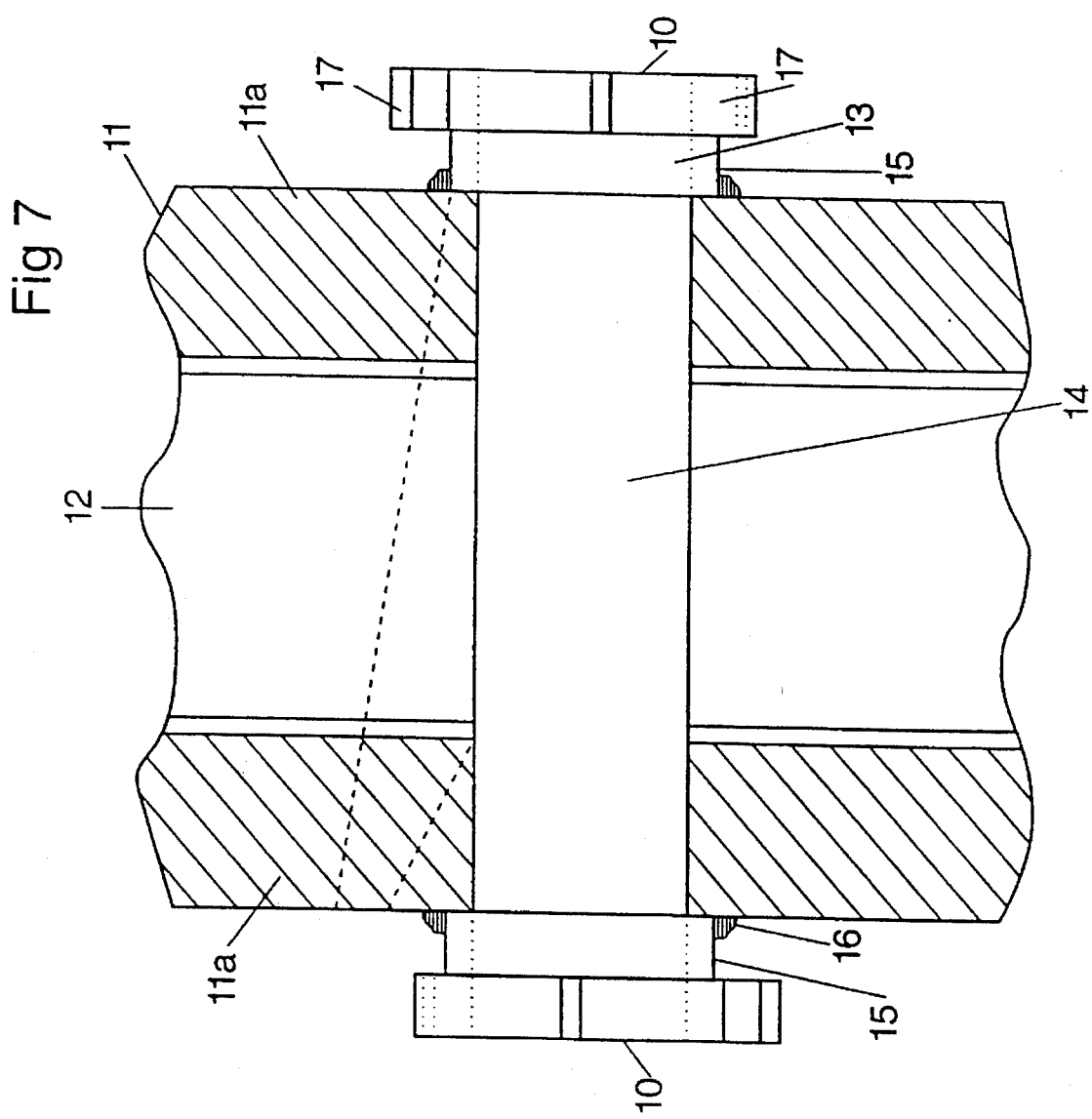

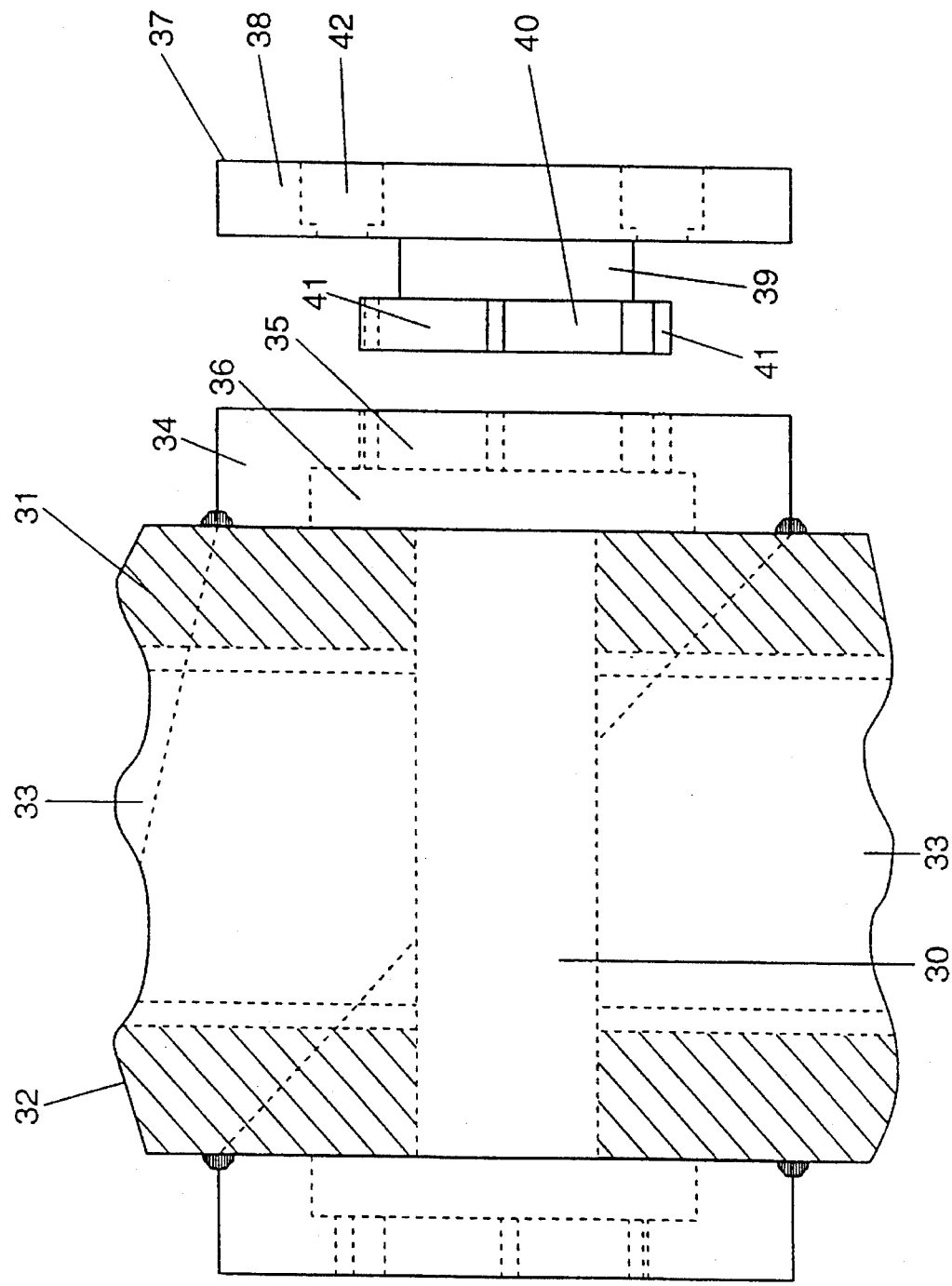

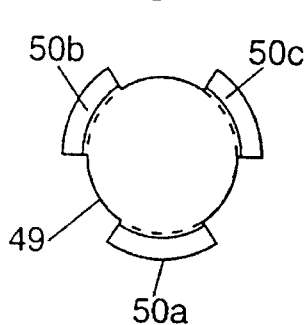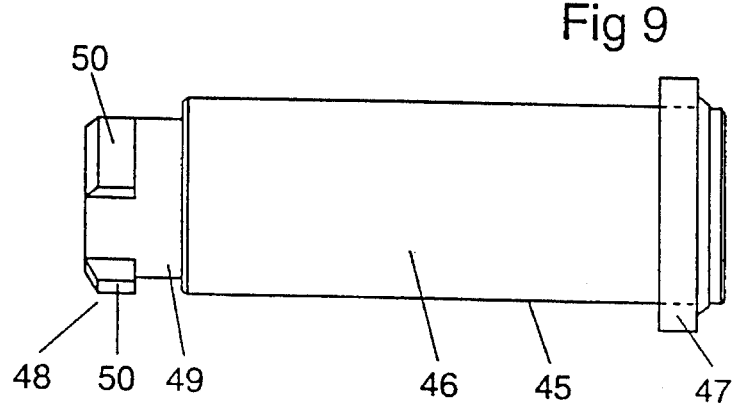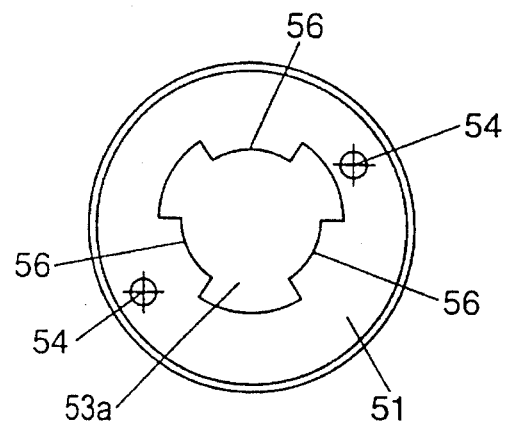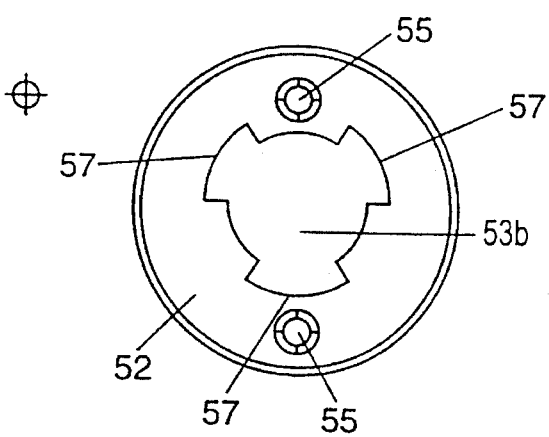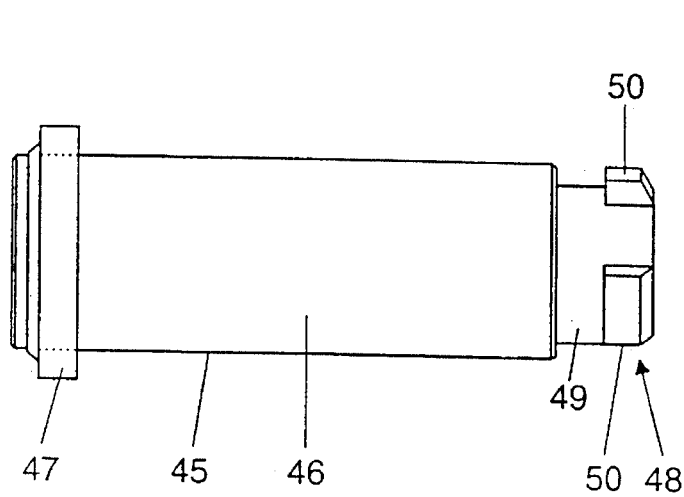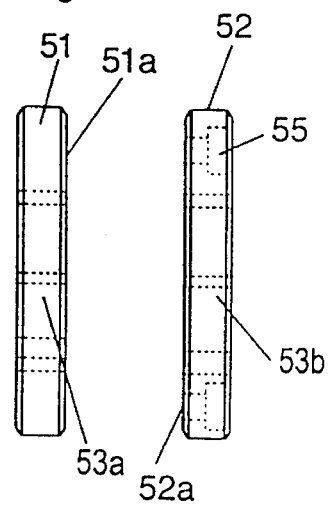

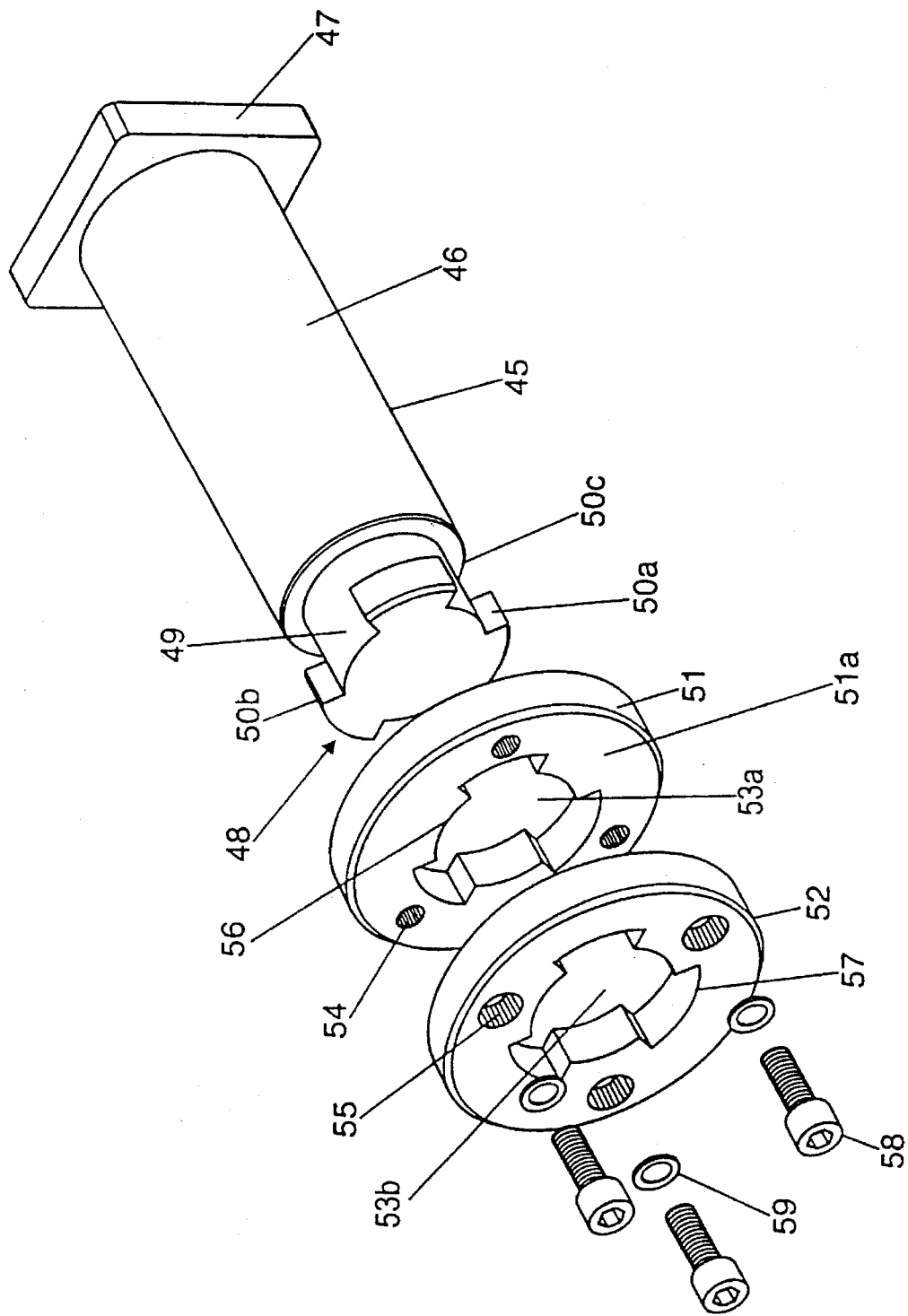

PIN RETENTION SYSTEM

FIELD OF THE INVENTION

This invention is concerned with improvements in releasable connection of a connecting pin to a coupling member such as a shackle or the like.

PRIOR ART

In the releasable attachment of one member to another in a wide range of engineering applications, it is common to use a connecting pin, which in some applications permits flexible or relative pivotal movement between the members so connected.

Typically such connecting pins may be used in:

rigid interconnection of boom elements of cranes, pivotal connection of a crane boom to a chassis or frame, shackle pins for chains and wire ropes, dragline bucket chain couplings, bucket and blade couplings for earthworking equipment, etc.

The connecting pins usually engage in aligned apertures in spaced cheeks or clevises associated with a coupling member such as a shackle and usually the pins have an enlarged head portion which engages on the outer surface of one cheek member with the free end of the pin extending outwardly from the outer surface of the opposite cheek or clevis. A locking or engaging means may be attached to the free end of the pin to prevent its withdrawal from the spaced cheeks or clevises of the coupling member.

There are a wide variety of releasable locking means for such pins including spring clips engaging through an aperture in the cheek or clevis of a shackle into a tangentially formed groove formed adjacent the free end of the pin and in some cases the spring members engage in apertures extending through the free end of the pin.

Although initially, such pin locking means are generally effective for their purposes, the effects of wear in the pin and the locking means soon reduces the reliability of retention therebetween and imposes a serious safety risk in operation of the apparatus. To avoid safety problems it is customary to weld the locking means to the pin as soon as wear becomes evident.

While welding of the locking means to the pin certainly enhances retention of the pin, this in turn gives rise to other problems.

In some cases the connecting pins include a rectangular head which engages in a socket of complementary shape in the cheek or clevis of the connection arrangement to prevent rotation of the pin in use. In other cases however, the connecting pin is free to rotate.

When a rotatable pin has its locking means welded to ensure retention, it is considered by some users that this can prevent the pin from rotating in use leading to premature wear on one side of the pin and also on the chain link, shackle, connecting eye or other coupling connected to the member by the pin. Other uses however prefer the pin to be locked against rotation so that they can visually monitor the effects of wear.

Another serious disadvantage associated with prior art pin retaining systems and/or the practice of welding the retaining means to the pin arises when it is necessary to uncouple members connected by the connecting pin or to replace the pin due to wear.

In many cases the weld between the retaining system and the pin may be ground or chiselled away or even cut off with an oxy-acetylene cutting torch. In more severe cases, an oxygen lance may be required to sever the connecting pin to facilitate its removal.

All of these removal systems are time consuming, occupationally hazardous and can lead to damage in one or both of the members coupled by the pin.

BRIEF SUMMARY AND OBJECTS OF THE INVENTION

It is an aim of the present invention to provide a retention means for a coupling pin, which retention means is simple and easy to operate while at the same time is reliable and safe in use.

According to one aspect of the invention there is provided a releasable retention means for a connecting pin of a coupling member said retention means comprising:

a male coupling element having an end boss with at least one radially extending projection;

a female coupling element having a flange member with an aperture of a shape complementary to said end boss having at least one radially extending projection, said male and female coupling elements in use being engagable by relative axial movement therebetween whereby said end boss is extendable through the aperture in said female element when said end boss is aligned with the aperture of complementary shape in said female element and, by relative coaxial rotation between said male and female coupling elements, said one or more radially extending projections engage against a retaining face of said flange member to prevent withdrawal of said boss through said aperture.

Preferably, said end boss comprises three radial projections spaced substantially evenly in the same plane.

Suitably, at least one of said radial projections differs dimensionally from an adjacent projection.

If required the male coupling element may be formed at one or both ends of a connecting pin.

Alternatively the male coupling element may be associated with an outer face of said coupling member coaxial with a pin receiving aperture in said coupling member to provide a coupling pin therethrough.

Alternatively the female coupling element may be associated with an outer face of said coupling member coaxial with a pin receiving aperture in said coupling member to receive a coupling pin therethrough.

If required a locking means is provided to retain said male and female coupling elements in coupled engagement.

Suitably said locking means comprises a locking member extending between said male and female coupling elements.

The releasable retention means may be adapted to permit relative rotation between said connecting pin and said retention means.

Alternatively the releasable retention means may be non rotatably secured to said connecting pin.

BRIEF DESCRIPTION OF THE DRAWINGS

In order that the invention may be more fully understood and put into practical effect, reference will now be made to a preferred embodiment illustrated in the accompanying drawings in which:

FIG. 7 shows an alternative embodiment of the invention.

FIG. 8 shows yet another embodiment of the invention.

FIG. 9 shows a connecting pin according to a further embodiment of the invention.

FIG. 9a is an end elevation view of FIG. 9.

FIGS. 10a and 10b show a pair of female coupling elements for use with the pin of FIG. 9.

FIG. 11 shows an exploded cross-sectional view of the assembly of the pin of FIG. 9 and the retention means of FIG. 10.

FIG. 12 shows an exploded isometric view of a modified form of the assembly of FIG. 11.

DETAILED DESCRIPTION OF THE ILLUSTRATED EMBODIMENTS

Figure 1:
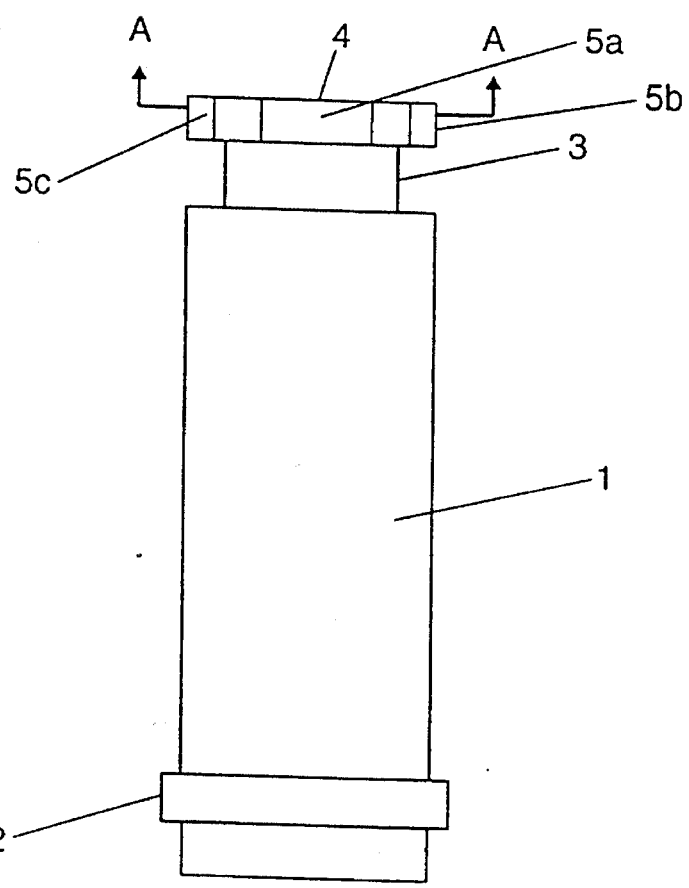
FIG. 1 is a side elevational view of a connecting pin according to one form of the invention.
Figure 2:
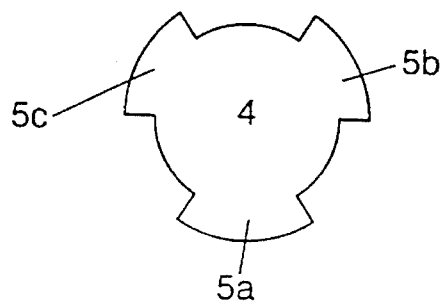
FIG. 2 is a cross sectional top plan view through A—A in FIG. 1.

In FIG. 1, the coupling pin comprises a generally cylindrical body portion 1, an enlarged head portion 2, a necked portion 3 and a shaped end portion 4 comprising three radially extending projections 5a, 5b, 5c as shown in FIG. 2. Each of projections 5a, 5b, 5c is of a different size. As seen in FIGS. 2, projections 5a, 5b and 5c are circumferentially equally spaced.

Figure 3:
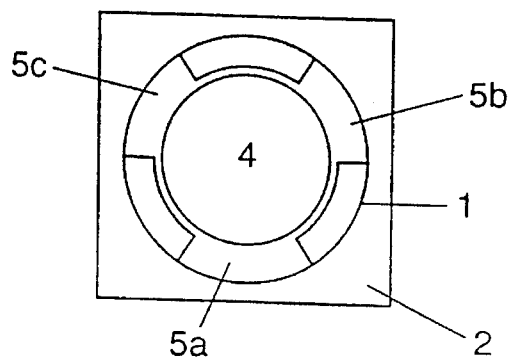
FIG. 3 is a top plan view of the pin of FIG. 1.

FIG. 3 shows a top plan view of the coupling pin of FIG. 1 wherein the head portion 2 is of a rectangular configuration.

Figure 4:
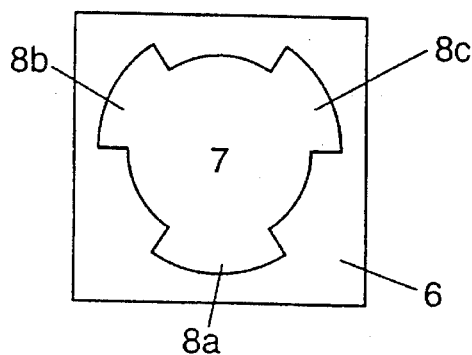
FIG. 4 is a plan view of a coupling element according to the invention.

FIG. 4 shows a retention means in the form of an apertured plate 6 comprising a generally circular central portion 7 having radially extending regions 8a, 8b and 8c corresponding in size and shape to projections 5a, 5b and 5c respectively.

When apertures 8a, 8b and 8c respectively are aligned with projections 5a, 5b and 5c, plate 6 is a neat sliding fit over shaped boss 4 of the pin.

Figure 6:
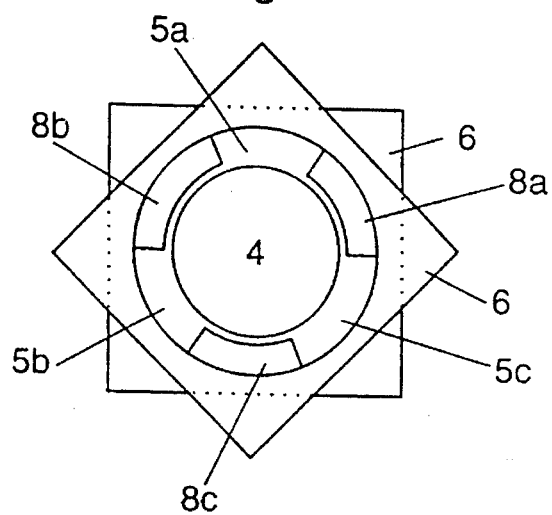
FIG. 6 is a top plan view of the arrangement of FIG. 5.
Figure 5:
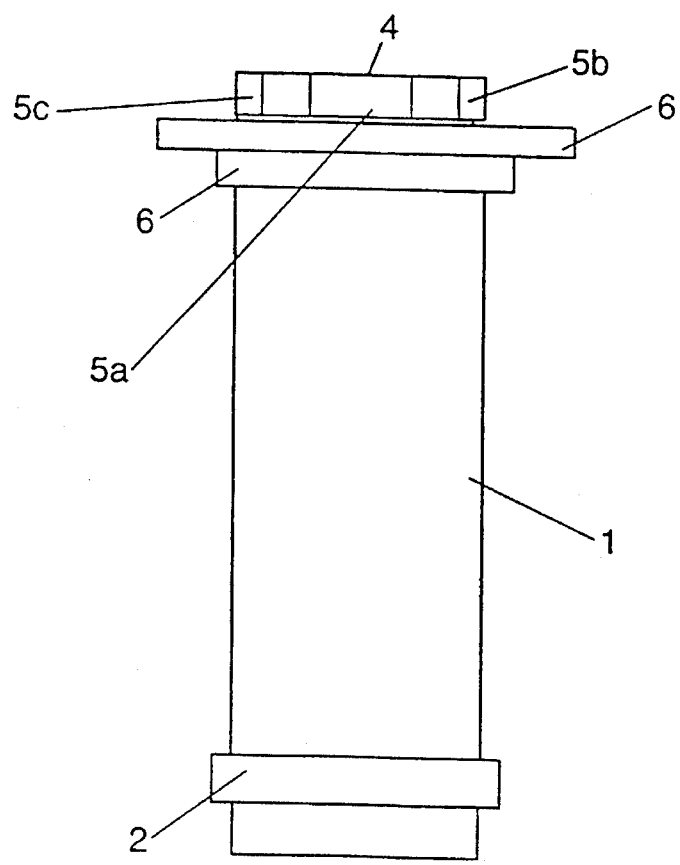
FIG. 5 is a side elevational view of the pin of FIG. 1 to which are attached a pair of coupling elements of FIG. 4.

FIGS. 5 and 6 show a pair of plates 6 engaged over the boss 4 of pin 1 with the regions 8a, 8b, 8c of lower plate 6 aligned with corresponding projections 5a, 5b and 5c of the pin. The upper plate 6 is rotated through 45° relative to lower plate 6 to misalign the respective regions 8a, 8b and 8c relative to projections 5a, 5b and 5c.

It will be readily apparent that when either or both of upper and lower plates 6 is rotated or otherwise moved such that respective aperture regions 8a, 8b and 8c are misaligned with projections 5a, 5b and 5c, the coupling pin may be securely retained in the coupling cheeks or clevises of say, a dragline bucket, crane boom couplings or pivot points etc.

Moreover as in most cases, the coupling pins are utilized in a horizontal position, the necked region 3 of the pin allows the retaining plates 6 to be displaced laterally relative to their axially aligned engagement/disengagement position.

With a rectangular pin head 2, the pin can, in use, be constrained against rotation to minimise the risk of disengagement between retaining plates 5 and the projections on the boss 4 of the pin. If required the pin may be allowed to rotate freely to minimise wear as in use the chance of both plates becoming simultaneously aligned with the respective projections against a gravitational force tending to laterally misalign the apertures in necked region 3 is considered a statistical improbability.

If required however, one or both of plates 6 may include a bendable tag (not shown) which may be bent downwardly with a hammer or the like when the plates are attached and axially misaligned. This ensures that relative rotation between the plates 6 cannot occur.

Alternatively, when two plates are employed, a bolt or set screw (not shown) extending through aligned apertures in the plates may retain the plates in an axially misaligned orientation.

In yet another embodiment employing either one or two plates 6, a set screw (not shown) could extend into a threaded radial aperture (not shown) in the boss 4 of the pin such that the projecting head of the set screw prevents the or each plate from being removed from the pin even when the plate apertures are aligned with the pin projections.

FIG. 7 shows an alternative embodiment of a connecting pin retaining means.

In this embodiment, boss members 10 are welded to the outer cheeks or clevises 11a of a shackle 11 (part shown) having a chain or cable eye 12 or the like located between cheeks 11a. Boss members 10 have a central aperture 13 which is axially aligned with connecting pin 14 securing the eye 12 to shackle 11. This permits pin 14 to be inserted or removed through a boss member 10.

Boss members 10 comprise a generally cylindrical neck 15 which is secured to cheek 11a by a weld bead 16. Located at the free end of each boss member 10 are three radially extending projections 17 having a configuration similar to the boss 4 in FIGS. 1 and 2.

A female coupling element 18 in the form of a circular flange has a first recess 19 having a cross sectional shape complementary to the cross sectional shape of boss 10 to permit the coupling element to be engaged over boss 10 such that boss 10 is located in a second recess 20 of generally circular shape and of a diameter larger than first recess 19 to form three circumferentially spaced shoulders 21.

After coupling element 18 is located over boss 10, coupling element 19 is rotated through about 60° to locate projections 17 in alignment with shoulders 21 whereby axial disengagement of the male coupling element (boss 10) and the female coupling element 18 is prevented.

A pair of socket headed set screws 22 are located in respective apertures 23 in coupling element 18, which apertures 23, when the assembly is in a locked position, are aligned with threaded apertures (not shown) in the end of boss 10.

When set screws 22 are secured the apertures 13 through which pin 14 may be removed or inserted are securely closed and the flange like female coupling element 18 provides protection against physical damage of the boss 17 during use. The coupling elements 18 may thus be removed readily to replace a worn pin 14.

Although in the embodiment shown, there is a clearance between the ends of the pin 14 and respective coupling elements 18 it should be understood that thrust washers or springs or cylindrical thrust bearers may occupy the spaces at the opposite ends of the pin.

FIG. 8 shows a similar arrangement to that of FIG. 7 except that the male and female coupling elements are reversed.

In this embodiment, as in FIG. 7 connecting pin 30 secures the cheeks 31 of shackle 32 to eye 33.

A female coupling element 34 have a first recess 35 and a second recess 36 of the same general configuration as that of coupling element 18 of FIG. 7.

Male coupling element 37 has a circular flange plate 38, a cylindrical neck 39 and a boss 40 having circumferentially spaced projections 41, again similar in configuration to boss member 10 of FIG. 7. Similarly, recessed apertures 42 receive the heads of socket headed set screws (not shown) which secured in aligned apertures (not shown) in female coupling element 34 to secure the retention assembly in a locked state.

FIGS. 9–11 illustrate yet another embodiment of the invention.

In FIG. 9 there is shown a connecting pin 45 having a cylindrical body portion 46 and a head portion 47 which may be circular or square in shape depending upon whether or not it is required for the pin to be rotatable or fixed against rotation.

Integrally formed on one end of the pin 45 is a male coupling element 48 having a cylindrical neck 49 and circumferentially spaced radial projections 50. As shown in FIG. 9a, which shows an end elevation of the boss 48, the radial projections 50a, 50b and 50c are not of identical size. Although the projections 50a, 50b and 50c may be equally spaced circumferentially, it is preferred that they are unequally circumferentially spaced.

Projection 50a has a width greater than projections 50b and 50c which have the same width. The radial angle between the central axes of projections 50a and 50b is 115° whilst the angle between 50a and 50c and 50c and 50b are 120° and 125° respectively. This difference in projection size and the angular spacing of the projections is preferred to ensure that the corresponding female coupling elements(s) can only be fitted in one position to ensure accurate alignment and a constant wear pattern in a locked position.

FIG. 10 shows a female coupling element assembly comprising a first apertured flange plate 51 and a second aperture flange plate 52.

Both of flange plates 51 and 52 have spaced apertures 53a, 53b, respectively, corresponding to the cross sectional shape of the neck 49 and projections 50 of pin 45 shown in FIG. 9.

Flange plate 51 includes threaded apertures 54 to receive the shanks of socket headed set screws (not shown) and flange plate 52 also includes recessed apertures 55 to receive the heads of the screws. Apertures 54 and 55 are radially misaligned by 60° relative to the positions of the matching apertures such that when apertures 54 and 55 are aligned and secured by set screws, their respective apertures 53 are misaligned by about 60°.

FIG. 11 shows an exploded view of the assembly of pin 45 and flange plates 51 and 52.

The female coupling element assembly (comprising plates 51 and 52) is secured to the pin 45 in two steps.

Firstly, the aperture 53a of plate 51 is aligned with projections 50 on boss 48 and plate 51 is slid axially along neck 49 until projections 50 extend beyond the outer face 51a of plate 51. Plate 51 is then rotated counter clockwise through about 60° until apertures 54 are aligned in an upright manner. In this position, the projections 50 of pin 45 are in shouldered abutment with the inwardly projecting regions 50 of plate 51.

Plate 52 is then aligned with projections 50 of pin 45 and is slid over projections 45 until the inner face 52a of plate 52 engages the outer face 51a of plate 51. In this position, apertures 54 and 55 of plates 51 and 52 respectively are aligned to permit set screws (not shown) to be secured therein.

The assembly of plates 51 and 52 comprising a female coupling element is thus securely locked to the boss 48 of pin 45 and relative rotation therebetween is prevented by the engagement of projections 50 in the corresponding radial notches 57 in aperture 53b of plate 52.

In the locked position, the female coupling element assembly protects the boss 48 on the end of pin 45 against wear or deformation in use.

A particular advantage of this embodiment is that by having the pin retention means coact directly with the pin itself, this embodiment is able to resist the outward "spreading" forces often encountered with shackles under heavy load conditions.

If required, plate 51 may be secured by welding to the outer face of a shackle cheek in a manner similar to the embodiments described in FIGS. 7 and 8.

FIG. 12 shows an exploded isometric view of a modified form of the assembly of FIG. 11 and for the sake of clarity the same reference numerals have been employed.

The assembly of FIG. 12 is substantially identical to that of FIG. 11 except that three set screws 58 with lock washers 59 are radially spaced by about 60° about the female coupling elements 51 and 52.

It will be readily apparent to one skilled in the art that notwithstanding wear, dirt and rust likely to occur in use, the coupling pins according to the invention may be readily attached or detached to members without the need for special equipment or the risk of damage to the members being coupled.

It will be equally apparent to a skilled artisan that many modifications and variations may be made to the invention without departing from the spirit and scope thereof.

I claim:

1. A releasable retention system for a clevis pin of a clevissed coupling member of heavy engineering equipment, said retention system comprising:

a male coupling element having an end boss with a least one radially extending projection;

a female coupling element having a flange member with an axially extending aperture of a shape complementary to a cross sectional shape of said end boss having at least one radially extending projection, said male and female coupling elements in use being slidably and non-rotatably engageable by relative axial movement therebetween whereby said end boss is extendable through the aperture in said female element when the at least one radially extending projection on said end boss is aligned with the complementary axially extending aperture in said female element and thereafter, by relative coaxial rotation between said male and female coupling elements, said one or more radially extending projections engage against a retaining face of said flange member to prevent withdrawal of said boss through said aperture, wherein when said male and female coupling elements are engaged, said end boss is circumferentially surrounded by said female coupling element for protection against physical damage.

2. A retention system according to claim 1 wherein said end boss comprises three radial projections spaced substantially evenly in the same plane.

3. A retention system according to claim 2 wherein at least one of said radial projections differs dimensionally from an adjacent projection.

4. A retention system according to claim 1 wherein the male coupling element is formed at one or both ends of said clevis pin.

5. A retention system according to claim 1 wherein the male coupling element is associated with an outer face of said coupling member coaxial with a pin receiving aperture in said coupling member to receive said clevis pin therethrough.

6. A retention system according to claim 1 wherein the female coupling element is on an outer face of said coupling member coaxial with a pin receiving aperture in said coupling member to receive said clevis pin therethrough.

7. A retention system according to claim 1 wherein a locking means is provided to retain said male and female coupling elements in coupled engagement.

8. A retention system according to claim 7 wherein said locking means comprises one or more locking members extending between said male and female coupling elements.

9. A retention system according to claim 7 wherein the locking means is adapted to permit relative rotation between said clevis pin and said retention system.

10. A retention system according to claim 7 wherein the locking means is non rotatably secured to said clevis pin.

11. A releasable retention system according to claim 1 wherein the axially extending aperture of said female coupling element comprises a first recess having a cross sectional shape complementary to the cross sectional shape of the end boss and a second circular recess of a diameter larger than the first recess.

12. A releasable retention system according to claim 11 including a closed end wall to completely surround said end boss when said female coupling element is coupled with said male coupling element.

13. A releasable retention system as claimed in claim 12 wherein said end boss includes two or more radial projections.

14. A releasable retention system as claimed in claim 11 wherein said male coupling element is formed at one or both ends of said clevis pin.

15. A releasable retention system as claimed in claim 11 wherein the male coupling element is coaxially disposed on an outer face of said coupling member with a pin receiving aperture in said coupling member to receive the clevis pin therethrough.

16. A releasable retention system as claimed in claim 11 wherein the female coupling element is coaxially disposed on an outer face of said coupling member with a pin receiving aperture in said coupling member to receive the clevis pin therethrough.

17. A releasable retention system according to claim 11 further comprising a locking means for retaining said male and female coupling elements in coupled engagement.

18. A releasable retention system according to claim 17 wherein said locking means comprises one or more locking members extending between said male and female locking members.

19. A releasable retention system for a clevis pin of a clevissed coupling member of heavy engineering equipment, said retention system comprising:

a male coupling element having an end boss with at least one radially extending projection;

a female coupling element having first and second flange members, each with an axially extending aperture of a shape complementary to a cross sectional shape of said end boss, said male and female coupling elements in use being slidably and non-rotatably engageable when the at least one radially extending projection on said end boss is extended through said aperture in said first flange member and into said aperture in said second flange member and thereafter by relative coaxial movement between said first flange member and, in combination, said male coupling element and said second flange member, said first and second flange members are fastened to prevent relative rotation between each other by locking means whereby said one or more radially extending projections of said male coupling element engage against a retaining face of said first flange member to prevent withdrawal of said end boss through the aperture of said first flange member, said end boss being circumferentially surrounded by said second flange member for protection against physical damage.

20. A retention system as claimed in claim 19 wherein said end boss comprises three radial projections.

21. A retention system as claimed in claim 19 wherein the male coupling element is formed at one or both ends of a clevis pin.

22. A retention system as claimed in 19 wherein the first flange member is secured to an outer face of said coupling member coaxial with a pin receiving aperture in said coupling member to receive said clevis pin therethrough.

* * * * *